UNITED STATES PATENT OFFICE.

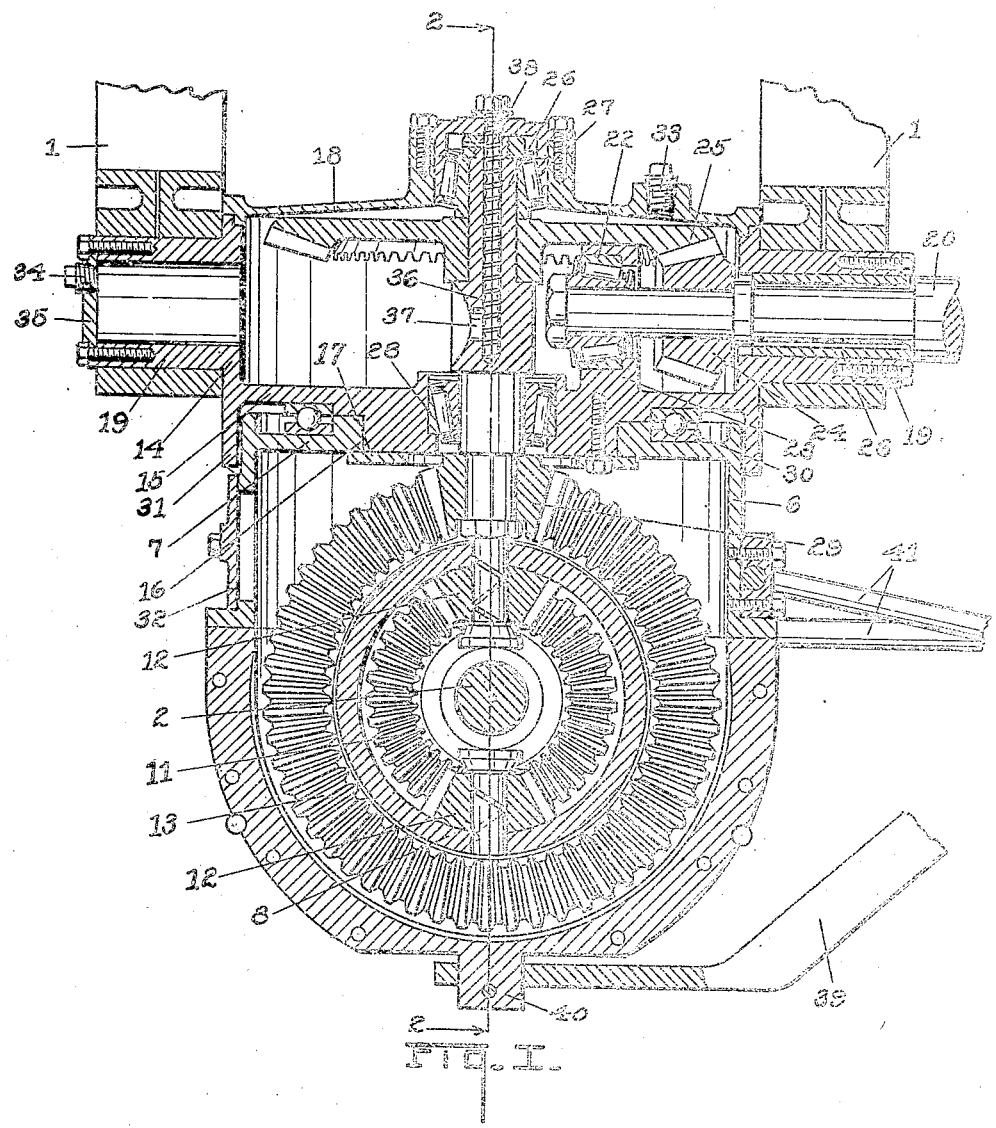

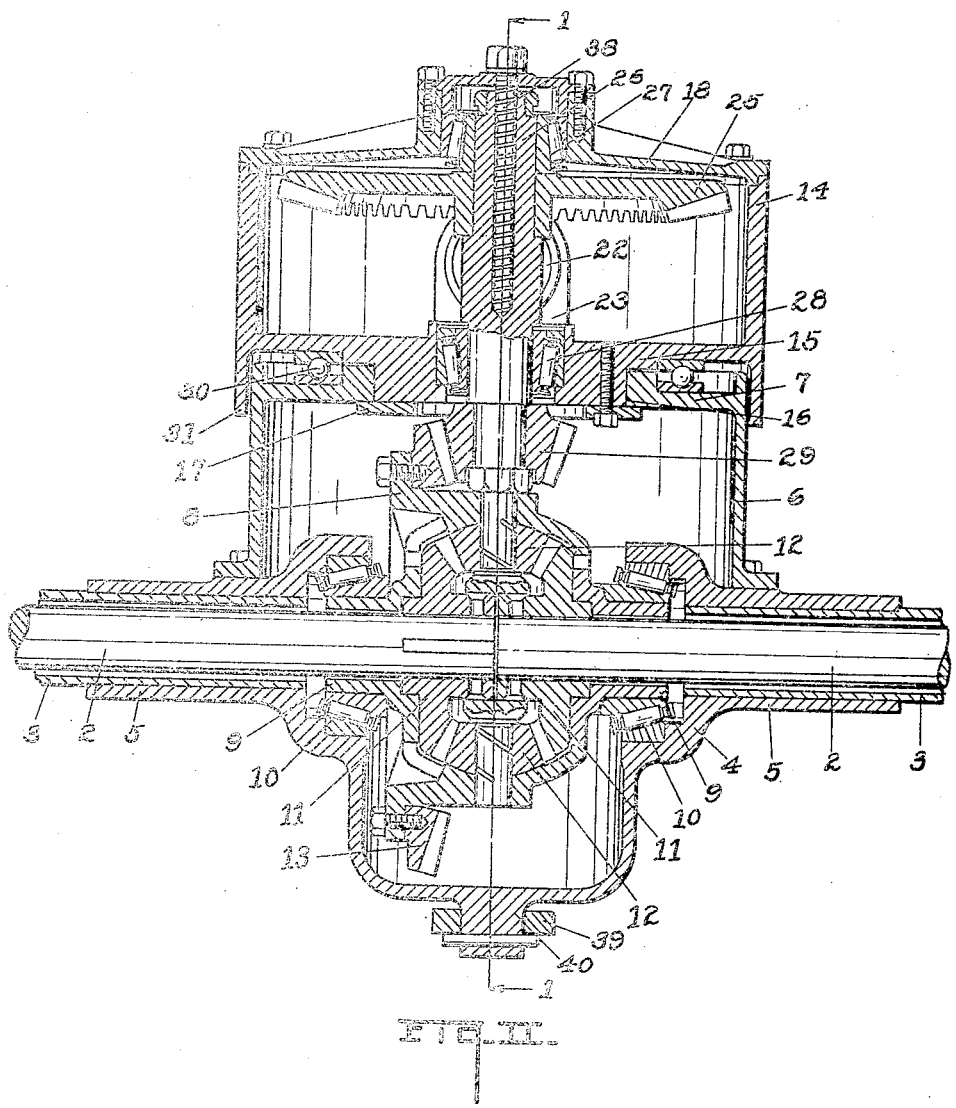

HENRY P. POLASKI, OF BIG RAPIDS, MICHIGAN, ASSIGNOR TO THE FOUR-DRIVE TRACTOR COMPANY, INC., OF BIG RAPIDS, MICHIGAN.

TRACTOR DRIVING-GEARING.

1,337,369.  Specification of Letters Patent.  Patented Apr. 20, 1920.

Application filed January 16, 1920. Serial No. 351,889.

*To all whom it may concern:*

Be it known that I, HENRY P. POLASKI, a citizen of the United States, residing at Big Rapids, county of Mecosta, State of Michigan, have invented certain new and useful Improvements in Tractor Driving-Gearing, of which the following is a specification.

This invention relates to improvements in tractor driving gearing.

The main objects of this invention are:

First, to provide an improved driving gearing for the steering wheels of a tractor or like motor vehicle which is very strong and durable and at the same time compact and simple in structure.

Second, to provide a structure having these advantages in which the bearing parts are effectively housed and lubricated.

Third, to provide a structure having the above named advantages in which the parts are simple and economical to manufacture and easily assembled and disassembled as occasion requires.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail vertical section of a structure embodying the features of my invention on a line corresponding to line 1—1 of Fig. II, parts being shown in full lines for convenience in illustration.

Fig. II is a detail vertical section on a line corresponding to line 2—2 of Fig. I with the parts shown in full lines for convenience in illustration.

In the drawing similar reference characters refer to similar parts throughout the several views, and the sectional views are taken looking in the direction of the little arrows at the ends of the section lines.

Referring to the drawing, 1—1 represents the supporting brackets or hangers on the tractor frame, the frame not being illustrated as it forms no part of this invention.

2—2 represent the driven axles. These are provided with tubular housings 3 which are connected at their inner ends to the base member 4 of the differential gearing housing, such base member having tubular extensions 5 in which the axle housings 3 are secured.

The top member 6 of the differential housing is cylindrical in form and provided with an internal flange-like bearing member 7 at its top. The differential gearing comprises the driving member 8 having journals 9 supported in bearings 10. The driven gears 11 are secured to the inner ends of the axles 2, the coacting planetary gears 12 being carried by the driving member 8. The driving member 8 is provided with a differential driving gear 13.

I provide a cylindrical gear box 14 having a bottom 15 provided with a bearing portion or member 16 coacting with the bearing member 7 at the upper end of the differential housing. A retaining ring 17 is secured on the under-side of the bottom 15 to engage the bearing 7, thus retaining the parts in their assembled relation.

The top 18 of the gear box is removable. The gear box has gudgeons 19 engaging the supporting brackets or hangers 1. The driving or propeller shaft 20 is disposed through one of these gudgeons and has a bearing 21 therein. At its inner end, the driving shaft is supported by a bearing 22 mounted on a pedestal 23 on the bottom of the gear box.

The driving shaft is provided with a beveled driving pinion 24 meshing with the downwardly facing beveled gear 25 on the jack shaft 26. This jack shaft 26 is supported by a bearing 27 in the top 18 of the gear box and a bearing 28 in the bottom of the gear box. On the lower end of the jack shaft is a pinion 29 meshing with the differential driving gear 13.

A thrust bearing 30 is arranged between the bearing member 7 of the differential housing and the bottom of the gear box. The flange 31 on the gear box embraces the upper end of the differential housing protecting this bearing 30 and preventing dirt from entering the differential gear housing which is adapted as a lubricant receptacle, a filling opening 32 being provided at the front side thereof.

The gear box is also adapted as a lubricant receptacle, a filling plug 33 being provided in the top 18 and also a filling plug 34 being provided in the cover plate 35 for the front gudgeon.

To supply lubricant to the upper bearing 27 of the jack shaft, the jack shaft has a longitudinal bore 36 having a lateral opening 37 at its lower end through which the lubricant may enter from the gear box. A spirally grooved rod 38 depends into this bore so that as the shaft is revolved the lubricant is carried up and delivered above the bearing 27.

A brace extends from the frame to the stud 40 on the lower end of the differential gear housing. The rods 41, shown in Fig. I, are also braced rods.

With this arrangement of parts, I secure a driving gearing for tractors and other heavy motor vehicles which is well adapted to withstand the severe strains and work to which it is subjected in use. It has the further advantage of being comparatively simple and economical in structure and very durable, the parts being accessible for renewal should occasion require.

I have not attempted to illustrate certain modifications which might be desirable in adapting my improvements to different tractors or motor vehicle structures as I believe the disclosure made will enable those skilled in the art to which my invention relates to embody or adapt the same as may be desired.

Having thus described my invention, what I claim as new and desire to secure by Letters Patent, is:

1. In a structure of the class described, the combination of a pair of driven axles, housings therefor, a differential housing having a cylindrical upper portion with an internal flange-like bearing member at its top, a differential driving gearing for said axles disposed within said differential housing and comprising a differential driving gear, a cylindrical gear box provided with supporting gudgeons, a removable top and a bottom having a bearing member coacting with said bearing member at the top of said differential housing and an annular flange embracing the upper end of said housing, a retaining ring secured to said gear box bottom to engage the under side of said bearing member, a thrust bearing disposed between the bottom of said gear box and said bearing member, a vertically disposed jack shaft projecting through the bottom of said gear box and having a pinion on its lower end meshing with said differential driving gear, bearings for said jack shaft on the bottom and top of said gear box, a downwardly facing beveled driven gear on said jack shaft, a driving shaft disposed through one of said gear box gudgeons and provided with a driving pinion meshing with said driven gear on said jack shaft, a bearing for the inner end of said driving shaft mounted on the bottom of said gear box, said gear box constituting a lubricant receptacle, said jack shaft having a longitudinal bore in its upper end opening into the gear box, and a spirally grooved rod mounted on the gear box top and depending into said bore for conveying lubricant to the upper bearing of said jack shaft.

2. In a structure of the class described, the combination of a pair of driven axles, housings therefor, a differential housing having a cylindrical upper portion with an internal flange-like bearing member at its top, a differential driving gearing for said axles disposed within said differential housing and comprising a differential driving gear, a cylindrical gear box provided with supporting gudgeons, a removable top and a bottom having a bearing member coacting with said bearing member at the top of said differential housing and an annular flange embracing the upper end of said housing, a retaining ring secured to said gear box bottom to engage the under side of said bearing member, a thrust bearing disposed between the bottom of said gear box and said bearing member, a vertically disposed jack shaft projecting through the bottom of said gear box and having a pinion on its lower end meshing with said differential driving gear, bearings for said jack shaft on the bottom and top of said gear box, a downwardly facing beveled driven gear on said jack shaft, a driving shaft disposed through one of said gear box gudgeons and provided with a driving pinion meshing with said driven gear on said jack shaft, and a bearing for the inner end of said driving shaft mounted on the bottom of said gear box.

3. In a structure of the class described, the combination of a pair of driven axles, a differential housing having a bearing member at its top, a differential driving gearing for said axles disposed within said differential housing and comprising a differential driving gear, a gear box provided with supporting gudgeons and a bottom having a bearing member coacting with said bearing member at the top of said differential housing, a thrust bearing disposed between the bottom of said gear box and said bearing member, a vertically disposed jack shaft projecting through the bottom of said gear box and having a pinion on its lower end meshing with said differential driving gear, bearings for said jack shaft on the bottom and top of said gear box, a driven gear on said jack shaft, a driving shaft disposed through one of said gear box gudgeons and provided with a driving pinion meshing with said driven gear on said jack shaft, a bearing for the inner end of said driving shaft mounted on the bottom of said gear box, said gear box constituting a lubricant receptacle, said jack shaft having a longitudinal bore in its upper end opening into the gear box, and a spirally grooved rod mounted on the gear box top and depending into said bore for conveying lubricant to the upper bearing of said jack shaft.

4. In a structure of the class described, the combination of a pair of driven axles, a differential housing having a bearing member at its top, a differential driving gearing for said axles disposed within said differential housing and comprising a differential driving gear, a gear box provided with supporting gudgeons and a bottom having a bearing member coacting with said bearing member at the top of said differential housing, a thrust bearing disposed between the bottom of said gear box and said bearing member, a vertically disposed jack shaft projecting through the bottom of said gear box and having a pinion on its lower end meshing with said differential driving gear, bearings for said jack shaft on the bottom and top of said gear box, a driven gear on said jack shaft, a driving shaft disposed through one of said gear box gudgeons and provided with a driving pinion meshing with said driven gear on said jack shaft, and a bearing for the inner end of said driving shaft mounted on the bottom of said gear box.

In witness whereof, I have hereunto set my hand and seal in the presence of two witnesses.

HENRY P. POLASKI. [L. S.]

Witnesses:
C. A. WATSON,
CLARENCE A. WATSON.